(12) United States Patent
Arcand

(10) Patent No.: US 6,892,202 B2
(45) Date of Patent: May 10, 2005

(54) OPTIMISTIC TRANSACTION COMPILER

(75) Inventor: Jean-Francois Arcand, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 530 days.

(21) Appl. No.: 10/124,825

(22) Filed: Apr. 17, 2002

(65) Prior Publication Data

US 2003/0200526 A1 Oct. 23, 2003

(51) Int. Cl.[7] .............................................. G06F 17/30
(52) U.S. Cl. ................................................ 707/10; 707/8
(58) Field of Search .......................... 707/8, 10, 104.1; 703/26, 27; 709/311, 315, 316, 326; 717/102, 106, 176

(56) References Cited

U.S. PATENT DOCUMENTS 6,269,373 B1 * 7/2001 Apte et al. .................... 707/10

2002/0016954 A1 * 2/2002 Charisius et al. ............. 717/2

* cited by examiner

Primary Examiner—Apu M Mofiz
(74) Attorney, Agent, or Firm—Martine Penilla & Gencarella LLP

(57) ABSTRACT

A method for updating Enterprise JavaBeans (EJB) classes is provided. Each EJB class is managed by an application server which maintains a database of active EJB classes. The method includes defining an update plug for an existing EJB class and assigning the update plug to the existing EJB. The method also includes compiling the existing EJB class using the update plug to generate a dependent EJB class. The dependent EJB class uses an adapter and a contract to gain access to methods of the dependent EJB class. Each method of the dependent EJB class is associated with an algorithm that defines a locking timestamp.

20 Claims, 11 Drawing Sheets

OPTIMISTIC TRANSACTION COMPILER

COPYRIGHT AUTHORIZATION

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to network of distributed computer systems, and more particularly, to methods and systems for improving the detection of conflicts resulting from data sharing in a network of distributed computer systems.

2. Description of the Related Art

As computers play a more and more significant role in our daily lives, users have been placing a greater emphasis in selecting software applications and computer system which would best serve the users' requirements. One of such widespread computer system designs is the network of distributed computer systems in which data is transferred between multiple clients (e.g., users) and servers in real time. Typically, the client makes a service request from the server program, which in turn fulfills the service request by providing the client with the service. The server is capable of providing services to a plurality of clients simultaneously as well as retrieving and storing data into a database. The network of the clients and server employs different software applications to enhance the performance of these tasks.

One of such software applications is the Enterprise JavaBeans (EJB) developed by Sun Microsystems, Inc. of Palo Alto, Calif. As is well known in the art, EJB implements usable components (i.e., EJB beans) which can be accessed by a plurality of clients using an application server. FIG. 1 is an illustration of a simplified EJB architecture 100, in accordance with the prior art. As shown in the EJB architecture 100 an application server 104 receives and processes a plurality of requests dispatched by a plurality of clients 106a–106b using data stored in a database 102. As shown, the database 102 includes a plurality of rows 102a–102b, each storing data for a corresponding EJB bean 108a and EJB bean 108b. For instance, the row 102a includes a plurality of methods Ma–Mc corresponding to the methods Ma–Mc of the EJB bean 108a. In a like manner, the row 102b includes a plurality of methods Md–Mh, corresponding to the methods Md–Mh of the EJB2 108b. In this manner, methods Ma–Mc of the EJB bean 108a and methods Md–Mh of the EJB bean 108b can be accessed and shared by multiple clients 106a–106b in real time using the application server 104.

Although beneficial, sharing data of different EJB beans 108a–108b by the first and second client 106a–106b in real time can create resource sharing conflicts. As a major shortcoming, resource sharing conflicts result from the first client 106a modifying the method Mb of EJB bean 108a. Specifically, the first client 106a can modify the method Ma without considering the negative ramification on the second client 106b who is simultaneously using the method Mb, as received in its original state. This conflict can further be exacerbated by both clients 106a and 106b modifying the method Ma from its original state without informing the other client of such modifications. Implementing inconsistent, conflicting, or stale methods is disfavored as it endangers the integrity of data shared by the network of computer systems.

Furthermore, where there is a need to update or modify the EJB bean 108, the clients 106a–106b must be informed individually and manually of the necessity to make any modifications. That is, the clients must be given ample time to close their respective instances of the EJB beans in use prior to any updating. Thereafter, the clients must recompile the EJB beans prior to reusing the EJB bean. Simply stated, modifying or updating the EJB beans cause unnecessary system downtime.

In view of the foregoing, there is a need for a methodology and system for minimizing resource sharing conflicts using an improved detection mechanism. There is also a need to for a methodology and system for minimizing downtime during data updating.

SUMMARY OF THE INVENTION

Broadly speaking, the present invention fills these needs by providing a flexible method and system for improving detection of data sharing conflicts through implementing a transaction compiler. In one example, a transaction compiler is implemented to synchronize data used substantially simultaneously by a plurality of users. According to one aspect, in an Enterprise JavaBeans (EJB) environment, an Enterprise JavaBeans transaction compiler (EJBTC) compiler is used to update an EJB bean. It should be appreciated that the present invention can be implemented in numerous ways, including as a process, an apparatus, a system, a device, or a method. Several inventive embodiments of the present invention are described below.

In one embodiment, a method for updating Enterprise JavaBeans (EJB) classes is disclosed. Each EJB class is managed by an application server which maintains a database of active EJB classes. The method includes defining an update plug for an existing EJB class and assigning the update plug to the existing EJB. The method also includes compiling the existing EJB class using the update plug to generate a dependent EJB class. The dependent EJB class uses an adapter and a contract to gain access to methods of the dependent EJB class. Each method of the dependent EJB class is associated with an algorithm that defines a locking timestamp.

In another embodiment, a method for managing shared use of Enterprise JavaBeans (EJB) classes is disclosed. Each EJB class is managed by an application server which maintains a database of active EJB classes. The method includes assigning an update plug to an existing EJB and compiling the existing EJB class using the update plug to generate a dependent EJB class. The dependent EJB class uses an adapter and a contract to gain access to methods of the dependent EJB class. Each method is associated with an algorithm that defines a locking timestamp. The locking timestamp is used to notify whether the dependent EJB has been updated since a last access to the dependent EJB class.

In yet another embodiment, a computer program embodied on a computer readable medium for updating Enterprise JavaBeans (EJB) classes managed by an application server is disclosed. The computer program includes a code segment that defines an update plug for an existing EJB class and a code segment that assigns the update plug to the existing EJB class. The computer program also includes a code segment that compiles the existing EJB class using the code segment that defines the update plug to generate a dependent class. The dependent class uses an adapter code segment and a contract code segment to gain access to methods of the dependent EJB class. Each method is associated with an algorithm code segment that defines a locking timestamp.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1:
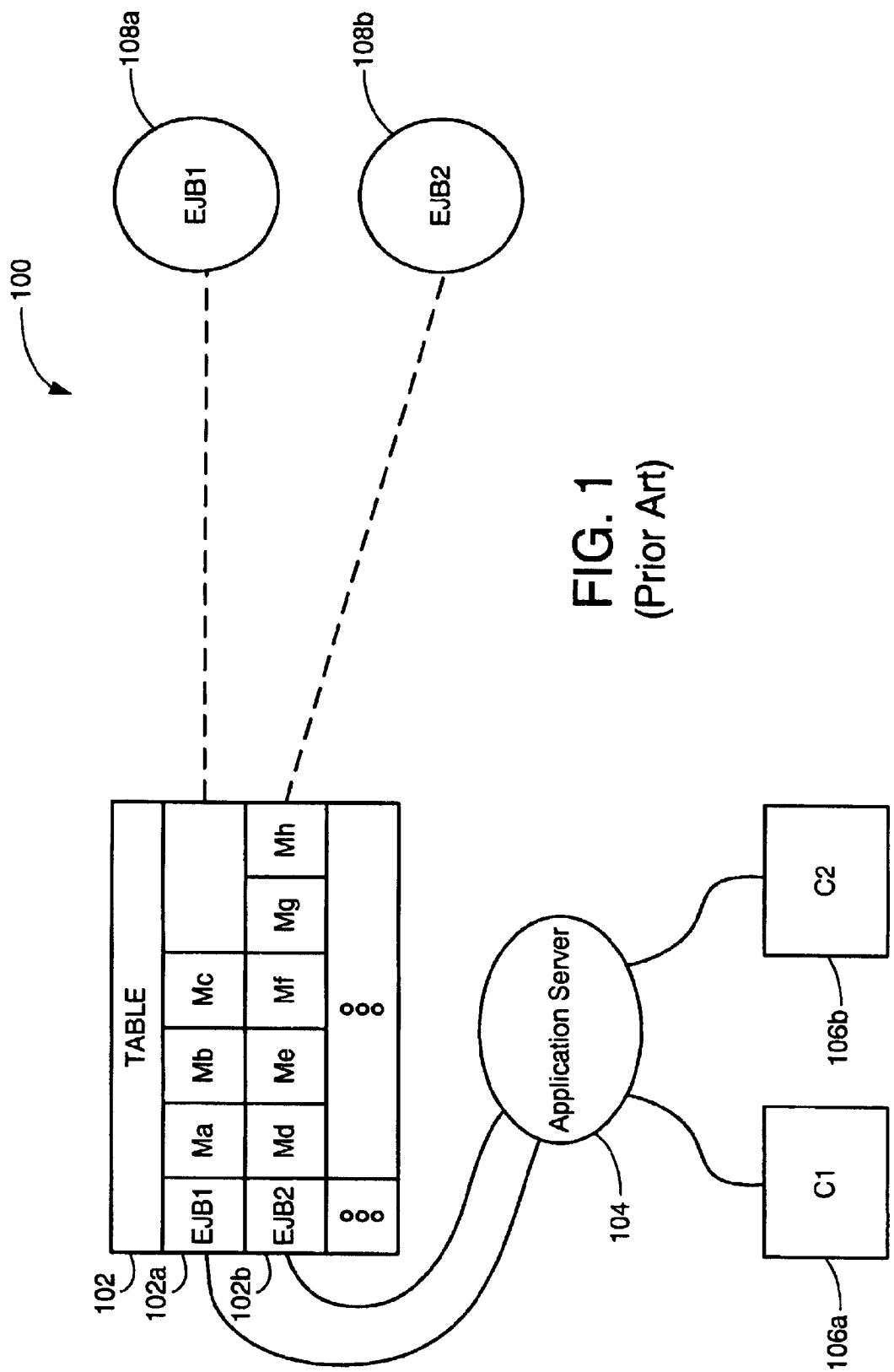
FIG. 1 is a simplified illustration of an exemplary Enterprise JavaBeans (EJB) architecture, in accordance with the prior art.

Inventions for improving a detection of data sharing conflicts through implementing a transaction compiler to synchronize data used substantially simultaneously by a plurality of users. In one example, in an Enterprise JavaBeans (EJB) environment, an Enterprise JavaBeans transaction compiler (EJBTC) compiler uses an optimistic transaction algorithm to detect modifications to the EJB beans, thus eliminating any potential write-write conflicts to any of the EJB beans. In one embodiment, the EJBTC compiler implements an optimistic algorithm to detect and resolve the problems associated with optimistic data locking. In one implementation, optimistic data locking relies on maintaining data unmodified while data is away from the application server. In one example, the EJBTC uses a timestamp of the EJB bean to determine whether there has been any modification to the EJB bean.

In one embodiment, the EJBTC compiler automatically updates the EJB bean, thus creating a dependent EJB bean having a plurality of extra methods in addition to almost all of the initial methods of the EJB bean. In one instance, the dependent EJB bean includes a plug component configured to contain the plurality of extra methods in the dependent EJB bean.

It will be understood, however, to one skilled in the art, that the present invention may be practiced without some or all of these specific details. In other instances, well known process operations have not been described in detail in order not to unnecessarily obscure the present invention.

As embodiments of the present invention implement the Enterprise JavaBeans (EJB) application, a brief introduction to EJB architecture is provided below. EJB is part of a larger overall technology known as the Java 2 Platform, Enterprise Edition (J2EE) developed by Sun Microsystems, Inc. J2EE provides architecture for developing, deploying, and executing applications in a distributed-object environment.

Summarily, EJB architecture promotes the creation of re-usable server-side behaviors or instructions in the Java language, connectors to enable access to existing enterprise systems, and easy-to-deploy program modules. The EJB architecture creates a collaborative architecture to provide services virtually anywhere, and for a wide range of customers and devices.

The EJB architecture defines a model for the development and deployment of reusable Java server components called EJB components (i.e., EJB beans). As designed, the EJB component is a non-visible server component having methods that provide business logic in a distributed application. In one example, the EJB architecture includes the EJB client and the EJB server. The EJB client is configured to provide the user-interface logic on a client machine and to make calls to remote EJB components on a server. For instance, the EJB client is provided the information as to how to find the EJB server and how to interact with the EJB components.

In one example, the EJB client does not communicate directly with the EJB component. In one aspect, the EJB container provides the client proxy objects that implement the home and remote interfaces of the component. In one example, the remote interface is configured to define the business methods that can be called by the client. In another embodiment, the client is configured to invoke the methods resulting in the updating of the database. Thus, the EJB beans are reusable components that can be accessed by client programs. The application programmer codes the business logic into the EJBs and deploys them into a J2EE compliant server. In one example, the server complying with the J2EE specification provides the required system-level services, thus allowing the application programmer to concentrate on business logic.

The EJB server (i.e., the EJB application) includes an EJB container, which in one example provides the services required by the EJB component. For instance, the EJB container may be configured to include one of an EJB home interface or EJB Remote interface and EJB beans. In one embodiment, the EJB home interface and the EJB remote interface are defined in the same Java virtual machine. In a different embodiment, the EJB home interface and the EJB remote interface may be defined on different Java virtual machines or separate physical computers.

In one example, the EJB specification defines a container as the environment in which one or more EJB components execute. In accordance to one example, the EJB container provides the infrastructure required to run distributed components thus allowing the clients and component developers to focus on programming business logic. Simply stated, the container manages the low-level communications between the clients and the EJB beans. In one example, once an EJB bean is created by a client, the client invokes methods on the EJB bean as if the EJB bean were running in the same virtual machine as the client.

Furthermore, the clients are unaware of activities on the EJB bean, since the container is configured to sit between the clients and the EJB beans. For instance, if an EJB bean is passivated, its remote reference on the client remains intact. Thus, when the client later invokes a method on the remote reference, the container activates the EJB bean to service the request.

The EJB container encapsulates:

The client runtime and generated sub classes. In one example, this allows the client to execute components on a remote server as if the components were local objects.

The naming service allows the clients to instantiate components by name. It further allows components to obtain resources (e.g., database connections, etc.) by name.

The EJB server component dispatcher, which in one example, executes the component's implementation class and provides services such as transaction management, database connection pooling, and instance lifecycle management.

In one example, three types of EJB components can be enumerated.

Stateful session Beans: A stateful session bean manages complex processes or tasks that require the accumulation of data. They further manage tasks that require more than one method call to complete but are relatively short lived, store session state information in class instance data, and have an affinity between each instance and one client from the time the client creates the instance until it is destroyed by the client or by the server.

Stateless session Beans: A stateless session bean manages tasks that do not require the keeping of client session data between method calls. Furthermore, the method invocation by a stateless session bean does not depend on data stored by previous method invocations, there is no affinity between a component instance and a particular client, and different instances of the stateless session beans are seemed identical to the client.

Entity Beans: An entity bean model is a business model that is a real-world object which methods are run on the server machine. When the entity bean method is called, the program's thread stops executing and control is passed to the server. When the method returns from the server, the local thread resumes executing. In one example, the entity beans have the following characteristics: Each instance represents a row in a persistent database relation (e.g., a table, view, etc.); and The bean has a primary key that corresponds to the database relation's key which is represented by a Java data type or class.

Each EJB component further has a transaction attribute configured to determine the manner the instances of the component participate in transactions. As designed, the EJB container provides services which can include transaction and persistence support to the EJB components. As to the transaction support, the EJB container is configured to support transactions. In one example, when the bean is deployed, the EJB container provides the necessary transaction support. In regard to the persistence support, the EJB container is configured to provide support for persistence of the EJB components, which in one embodiment, is defined as the capability of the EJB component to save and retrieve its state. In this manner, the EJB component does not have to be re-created with each use.

In one example, the EJB architecture is a three-tiered architecture in which the clients reside on the first tier, the application server and the components (i.e., EJB beans) reside on the second tier, and the databases reside on the same host as the EJB server. In accordance to one implementation, the EJB server executes methods on a component from the client or another component, retrieves data from databases, and performs other communications. The EJB server further handles the details of transactions, threads, security, database connections, and network communication. Summarily, the EJB clients request business-logic services from EJB beans running on the second-tier. The EJB beans then use the system services provided by the second-tier server to access data from existing systems in the third tier. The EJB beans apply the business rules to the data, and return the results to the clients in the first-tier.

In one example, the client contains the user interface. The business logic is configured to be separate from both the clients and the databases and resides in the same tier (i.e., second tier) as components that analyze data, perform computations, or retrieve information from data sources and processes.

As EJB implements the Java™ (hereinafter "Java") programming language, in a like manner, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HyperText Transport Protocol (HTML) documents or launched standalone. When a Java program runs from a Web page, it is called a "Java applet," and when run on a Web server, the application is called a "servlet."

Java is an interpreted language. The source code of a Java program is compiled into an intermediate language called "byte code". The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Figure 2:
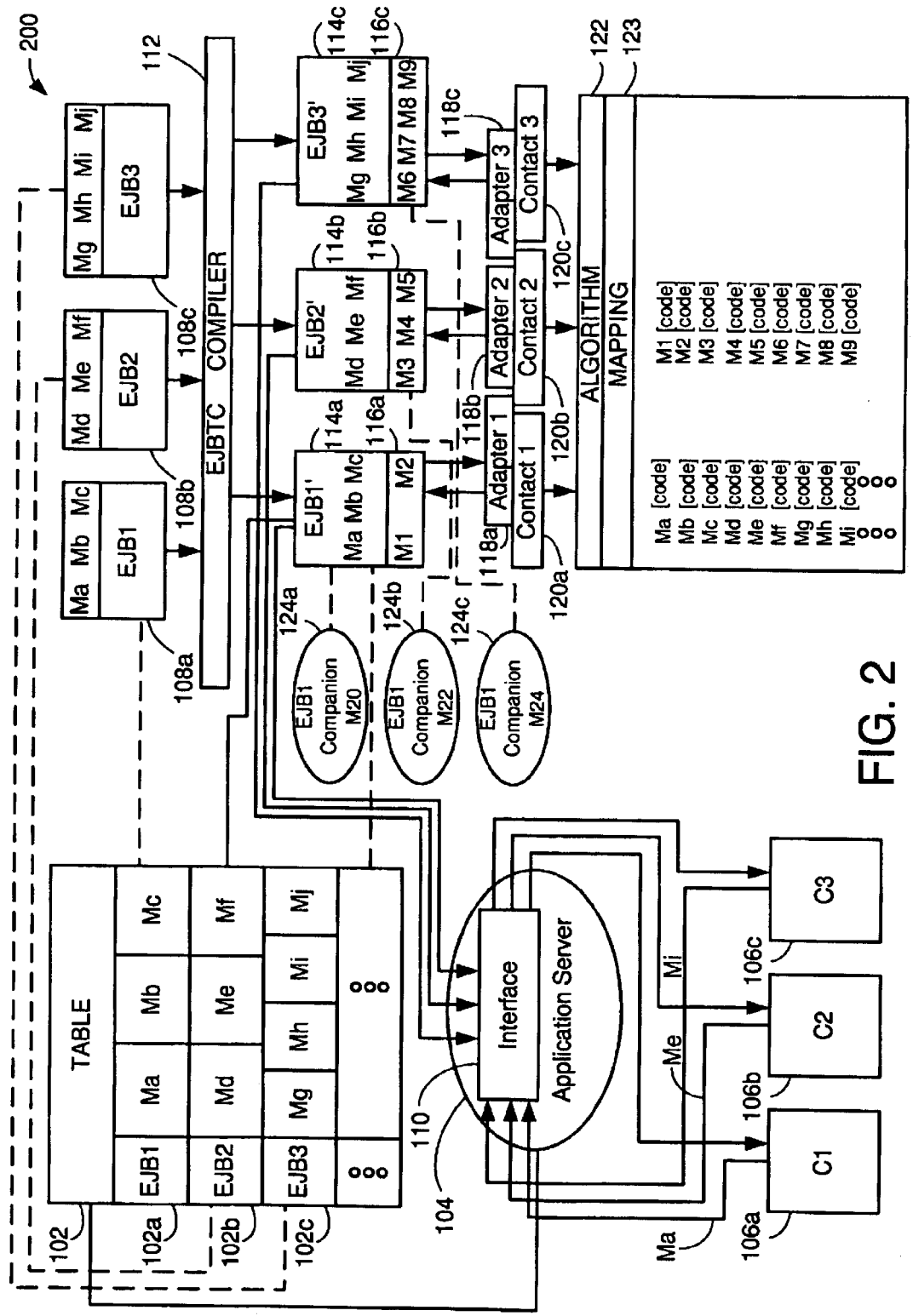
FIG. 2 is a simplified block diagram depicting the automatic updating of a plurality of EJB beans into a plurality of corresponding dependent EJB beans using an enterprise JavaBeans transaction compiler (EJBTC), in accordance with one embodiment of the present invention.

Keeping the brief overviews of EJB and Java as they relate to the present invention in mind, reference is now made to a simplified illustration of FIG. 2 depicting the automatic updating of a plurality of beans 108a–108c into a plurality of corresponding dependent beans 114a–114c using an enterprise JavaBeans transaction compiler (EJBTC) 112, in accordance with one embodiment of the present invention. As shown, in the embodiment of FIG. 2, the clients 106a–106c each dispatch separate requests to an interface 110 of an application server 104, requesting methods Ma, Me, and Mi, respectively. Upon receiving the requests, the application server 104 refers to a database 102, which in one embodiment, is a table including a plurality of rows 102a–102c, each corresponding to an EJB bean 108a–108c. As shown, each row 102–102c of the database 102 includes a plurality of columns, including a primary key column, and a column including each of the associated business methods. For instance, row 102a includes business method Ma, Mb, and Mc, while rows 102b and 102c respectively include business methods Md, Me, and Mf, and Mg, Mn, Mi, and Mj.

In one example, upon locating of each method in the database 102, the respective EJB bean 108a–108c is instantiated. In one aspect, each EJB bean 108a–108c is a class each including the methods Ma, Mb, and Mc, Md, Me, and Mf, and Mg, Mn, Mi, and Mj, respectively.

Subsequent to being instantiated, each of the EJB beans 108a–108c is compiled using the EJBTC compiler 112 of the present invention. In one aspect, the EJBTC compiler 112 is used to automatically update each of the EJB beans 108a–108c by injecting a plurality of business methods M1–M2, M3–M5, and M6–M9, thus creating a plurality of respective dependent EJB beans 114a–114c. As shown, each of the dependent EJB beans 114a–114c includes a plug component 116a–116c, each of which includes the respective extra methods M1–M2, M3–M5, and M6–M9 configured to be injected into each of the EJB beans 114a–114c. Accordingly, as depicted, the new dependent EJB beans 114a–114c each includes both the respective initial business methods as well as the extra injected methods shown in the plug component 116a–116c.

By way of example, the EJB bean 114a includes a plurality of methods Ma–Mc (business methods identical to the business method of EJB bean 108a) and a plurality of extra business method M1 and M2 as included in the plug component 116a of the dependent EJB bean 114a. In a like manner, the EJB bean 108b has been compiled into the dependent EJB bean 114b having a plug component 116d. As shown, the dependent EJB bean 114b includes the business methods identical to those of the EJB bean 108b further including a plurality of methods M3–M5 of plug 116b. Likewise, the dependent EJB bean 114c formed as a result of compilation of the EJB bean 108c includes the business methods Mg–Mi (methods identical to those of the EJB bean 108c) further including the methods M6–M9 defined in the plug 116c.

In one aspect of the present invention, the plug components 116a–116c are pluggable and easy to configure. Each of the plug components 116a–116c calls the respective adapter 118a–118c. Each of the adapters 118a–118c is configured to know of the business methods in each of the respective plug component 116a–116c and is configured to perform the transaction and the updating of the dependent EJB bean 106a. Each of the adapters 118a–118c then refers to the respective contract 120a–120c, with each contract 120a–120c having knowledge of each of the methods in each of the respective plug components 116a–116c. As used herein, the contracts 120a–120c are the application programming interfaces which allow the algorithms to be pluggable.

At this point, each of the contracts 120a–120c is implemented to map each of the business methods Ma–Mc, Md–Mf, Mg–Mj, M1–M2, M3–M5, and M6–M9, to a respective algorithm A1–A3, as defined in the algorithm component 122 . As shown, the algorithm component 122 includes the code for each of the business methods. In one instance, the adapters 118a–118c are configured to substantially perform the same type of task. As such, the EJB beans 108a–108c need not be aware as to the manner the selected algorithm is configured to perform. In this manner, beneficially, any time any of the business methods of any of the EJB beans required to be updated is called, the EJBTC compiler of the present invention can automatically update the EJB bean into a new EJB bean, which includes the updated methods. Furthermore, the pluggable characteristic of the plug component 116a of the present invention allows different algorithms to be implemented.

As shown, in one aspect, each dependent EJB bean 114a–114c creates a respective local companion component 124a–124c. In one example, each companion component includes a corresponding business method M20, M22, and M24, with the business method M20 including methods Ma–Mc and M1–M2, the business method M22 including methods Md–Mf and M3–M5, and M24 including methods Mg–Mj and M6–M9, respectively (i.e., the initial business methods for each EJB bean as well as the extra methods of each of the plug components). Once the companion components 124a–124c have been created, the application server 104 can be designed to communicate to the local companion components 124a–1124c, substantially reducing the communication time as well as communication cost. In this manner, the clients 106a–106c can implement the companion components 124a–124c to communicate with the corresponding dependent EJB bean 114a–114c, locally.

Figure 3A:
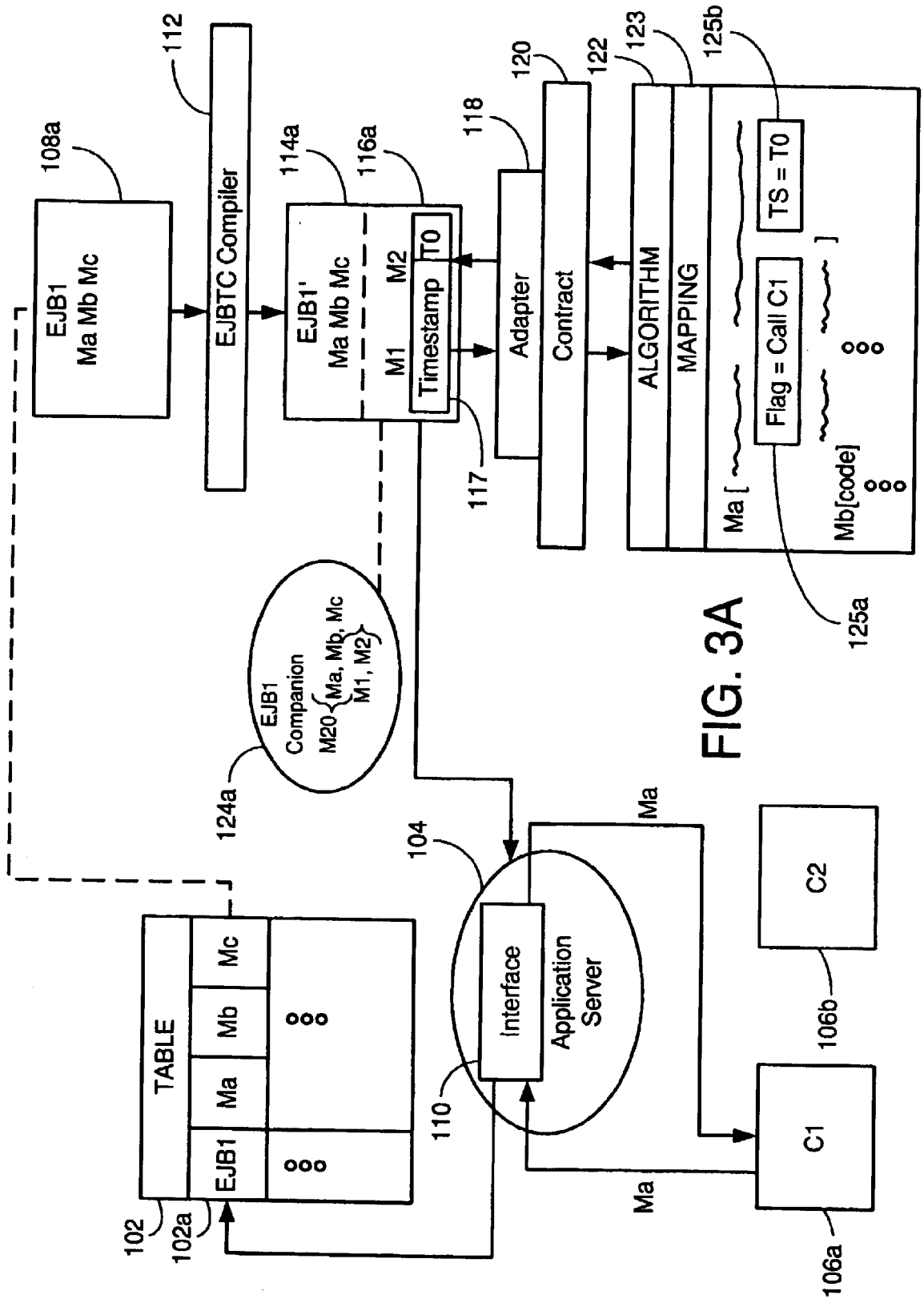
FIG. 3A a simplified block diagram illustrating the capability of the present invention to synchronize the EJB beans persistent state used simultaneously by a plurality of clients, in accordance with yet another embodiment of the present invention.

The capability to synchronize the EJB beans persistent state when used simultaneously by a plurality of clients can further be understood with respect to the illustrations of FIG. 3A-3d, in accordance with one embodiment of the present invention. As shown in the embodiment of FIG. 3A, the client 106a communicates to the application server 104 using the interface 110, requesting the method Ma. In one implementation, the application server 104 is configured to manage the updating of the database 102 and manage the EJB bean 108a. For instance, the application server 104 is configured to interpose between the communication between the client 106a and the EJB bean 108a. In one aspect, the application server 104 uses the interface 110 to achieve this task.

Upon receiving the request for Ma the client 106a, the application server 104 refers to the row 102a of the database 102. In one implementation, the database 102 is a table, which includes the persistent state of the EJB bean 108a. By way of example, the client 106a submits the primary key of the EJB bean 108a to the application server 104, requesting the method Ma. Upon receiving the request, the application server 104 searches the database 102 attempting to find the EJB bean having the primary key submitted by the client 106a. In this scenario, the EJB bean 108a exists as the respective primary key can be retrieved from the database 102. In a different embodiment, if the application server 104 cannot locate the primary key of a requested bean, the requested primary bean is created by the application server.

Upon locating the business method Ma in the row 102a of the database 102, the EJB bean 108a is instantiated. As shown, the EJB bean 108a includes the plurality of methods Ma–Mc. Thereafter, the EJB bean 108a is compiled by the EJBTC compiler 112 of the present invention, creating the dependent EJB bean 114a. As shown, the dependent EJB bean 114a includes the extra methods M1–M2 in addition to the initial methods Ma–Mc of the EJB bean 108a. The extra methods M1–M2 are defined in the plug component 116a. In this manner, the EJBTC compiler 112 is implemented to automatically inject the methods M1–M2 into the EJB bean 108a, creating a dependent EJB bean 114a.

As discussed in further detail with respect to FIG. 2, the plug component 116a of the dependent EJB bean 114 a calls the adapter 118. According to one aspect of the present invention, the adapter 118 is created when the dependent EJB bean 114a is instantiated. As designed, using the adapter 118 enables the EJBTC compiler to include the selected algorithm into the dependent EJB bean 114a. For instance, the adapter 118 can be configured to receive the request for a method Ma and delegates the request to the contract 120, which locates a selected algorithm.

Once the contract 120 is delegated the method Ma by the adapter 118, the contract 120 uses a mapping component of the algorithm component 122 in search of the appropriate algorithm. Upon finding the suitable algorithm, a flag 125a is marked to include the calling of the method Ma by the client 106a. Next, the algorithm 122 returns the called method Ma to the contract 120 and then to the adapter 118, which in turn communicates the called method Ma to the client 106a by using the dependent EJB bean 114a and the interface 110 of the application server 104.

As shown, according to one aspect of the present invention, the plug component 116a includes a timestamp component (i.e., update timestamp) 117, which value in this embodiment is t0. That is, in one example, the dependent EJB bean 116a was updated at a time t0. As shown, the code component of the method Ma includes a locking timestamp 125a', which in this embodiment reflects the last time the dependent EJB bean 114a was modified using the method Ma.

In one embodiment, to eliminate the necessity to make additional non-local connections, upon being instantiated, the dependent EJB bean 116a creates a companion component 124a. The companion component 124a includes the method M20, which is configured to include a set of the methods Ma–Mc and the extra methods M1–M2. In this manner, the client 106a can locally find any of the methods in the EJB bean 108a using the companion component, substantially eliminating the cost and time necessary to communicate with the non-local components.

Figure 3B:
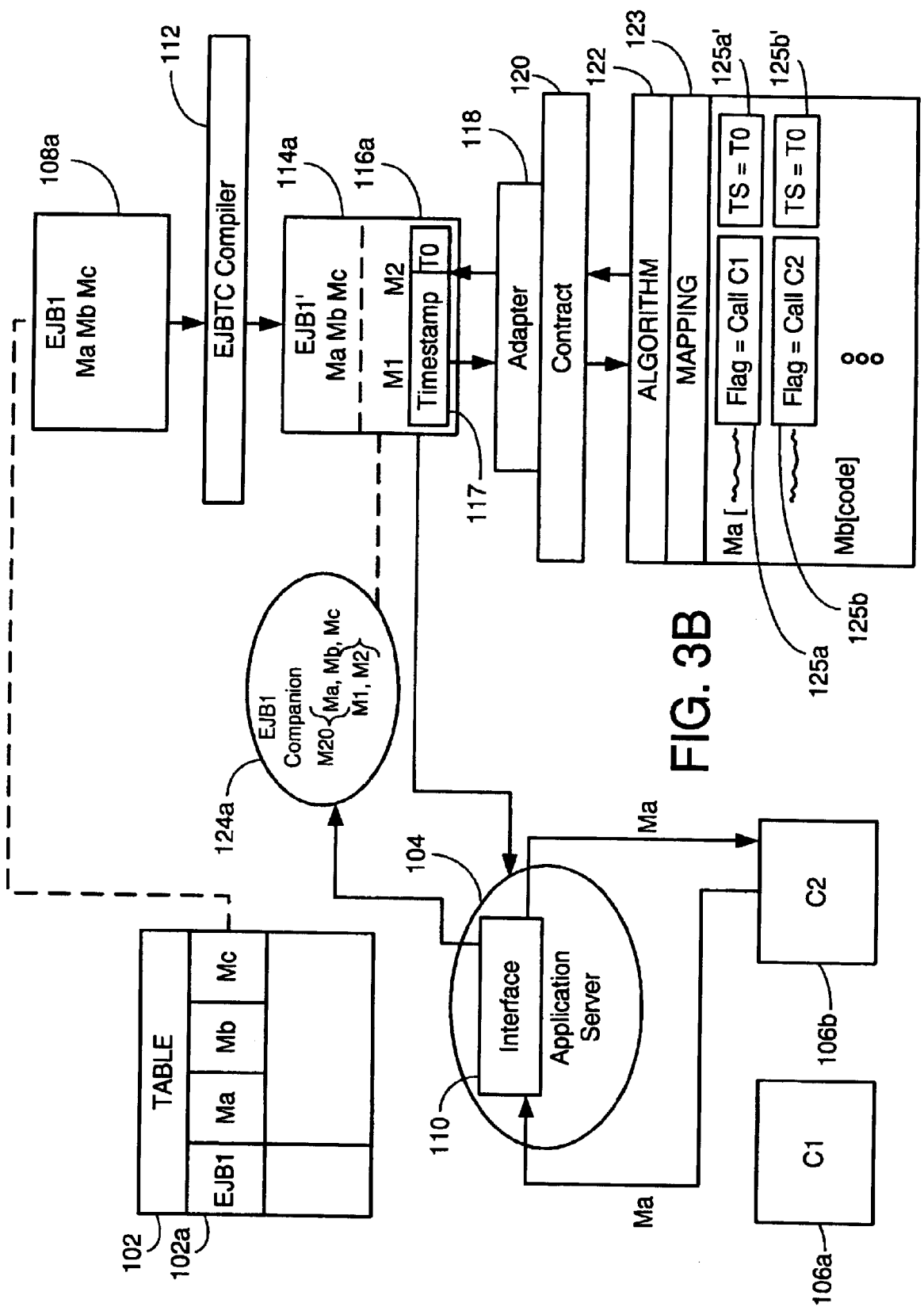
FIG. 3B is a simplified block diagram illustrating the capability of the EJBTC compiler of the present invention to allow multiple clients to request copies of the same method, in accordance to yet another embodiment of the present invention.

Referring to FIG. 3B, the capability of the EJBTC compiler 112 of the present invention to allow multiple clients 106a–106b to request copies of the method Ma of the EJB bean 108a can further be understood, in accordance with one embodiment of the present invention. As shown, the client 106b has requested the method Ma. In one instance, the client 106b communicates with the interface 110 of the application server 104. In one example, rather than the application server 104 attempting to use the database 102 to locate the method Ma, the application server 104 communicates the request for the method Ma to the local companion component 124a, thus reducing cost and time. Thereafter, the companion component 124a communicates with the dependent EJB 114a, which then communicates with the adapter 118, requesting the method Ma. The adapter 118 in turn delegates the request for the method Ma to the contract 120, which uses the mapping component 123 of the algorithm component 122 to locate the method Ma. At this point, a flag 125b in the code for the method Ma is marked, indicating the calling of the method Ma by the client 106b. As shown, in this embodiment, the code for the method Ma includes two flags, flag 125a and 125b, revealing the calling of the method by two different clients 106a and 106b.

Upon mapping the method Ma in the algorithm component 122 and flagging its code to indicate the calling of the method by the client 106b, the method Ma is sent to the contract 120, and thereafter, to the dependent EJB 114a and then the client 106b.

As shown, the timestamp 117 in the companion component 116a is still set to the time t0. That is, the method Ma of the EJB bean 114a was last updated at the time t0. As further shown, the locking timestamp 125b' in the code for the method Ma is also shown to have the value of t0.

Figure 3C:
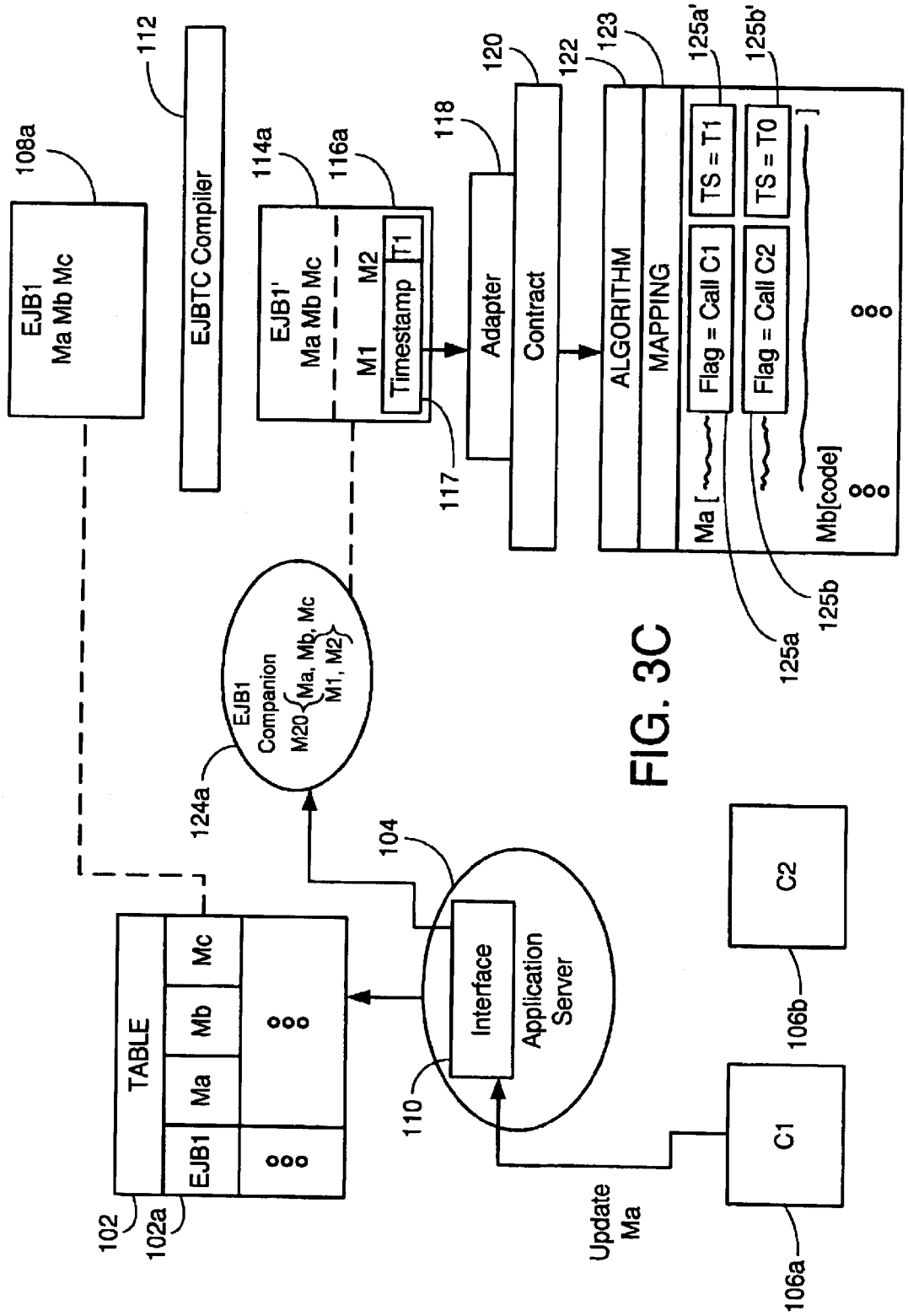
FIG. 3C a simplified block diagram illustrating the updating of the method by the client using the interface component of the application server, in accordance to still another embodiment of the present invention.
Figure 3D:
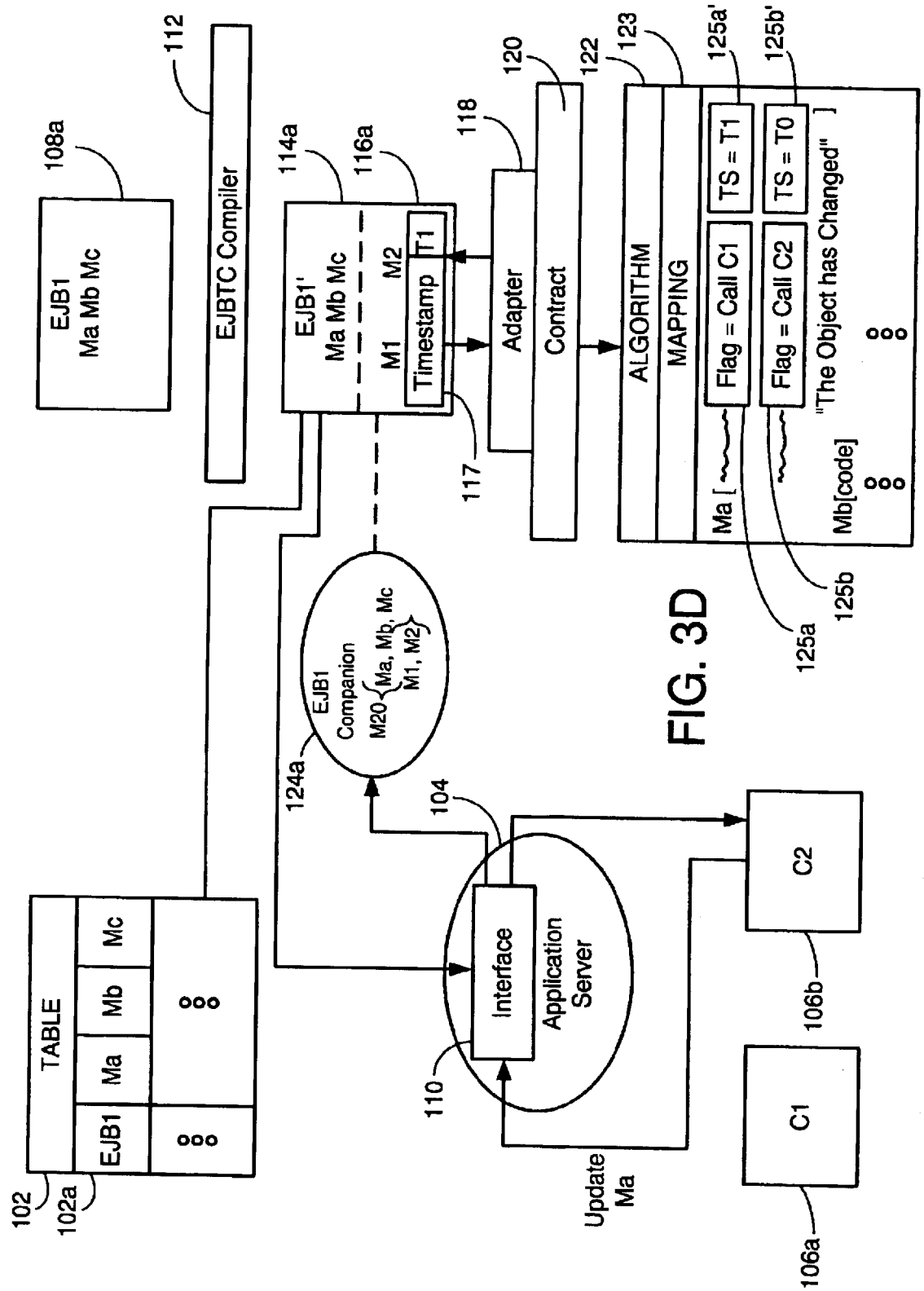
FIG. 3D a simplified block diagram illustrating the capability of the EJBTC compiler of the present invention to detect potential modification conflicts when clients have simultaneous access to an EJB bean, in accordance with still another embodiment of the present invention.

The updating of the method Ma by the client 106a using the interface component 110 of the application server 104 can further be understood with respect to the simplified block diagram of FIG. 3c, in accordance to one embodiment of the present invention. As shown, the update request for the method Ma is communicated to the companion component 124a, which in turn communicates to the adapter 118 and then the dependent EJB 114a. The contract 120 is then delegated the update request for the method Ma which uses the mapping component 123 of the algorithm component 122 to locate the code for the method Ma.

In one embodiment, to update the method Ma of the dependent EJB bean 114a, the dependent EJB bean 114a is first read by the adapter 118a so as to verify that the locking timestamp 125a is identical to the timestamp 117 of the dependent EJB bean 114a. In this manner, prior to modifying the method Ma of the dependent EJB bean 114a, the adapter 118a confirms that the method Ma has not been modified by any of the other clients. As in this implementation the method Ma of dependent EJB bean 114a has not been modified by the client 106b, the timestamp 117 of the dependent EJB bean 114a and the timestamp of the locking timestamp 125a' of the algorithm component are identical. Upon confirming this data, the timestamp 117 of the method Ma of the dependent EJB bean 114a is changed to the time of modification, t1. In a like manner, the locking timestamp 125a' of the method Ma of the algorithm component 122 is changed to the time t1.

Once the updating of the method Ma has concluded, the application server 104 updates the row 102a of the database 102, ensuring that the database 102 includes the updated information regarding the dependent EJB bean 108a.

The capability of the EJBTC compiler 112 of the present invention to detect potential modification conflicts when clients 106a and 106b have simultaneous access to an EJB bean 108a can further be understood with respect to the simplified block diagram 3D, in accordance with one embodiment of the present invention. As shown, a request to update the method Ma by the client 106b is communicated to the dependent EJB bean 114a using the interface component 110 of the application server 110 and the companion component 124a.

At this point, the dependent EJB bean 114a is read to compare the time t0 of the locking timestamp 125b' of the method Ma with the time t1 of the timestamp 117 in the plug component 116a of the dependent EJB bean 114a. As depicted, the timestamps 125b' and 117 are not identical. Specifically, this is due to the last updating of the method Ma by the client 106a, as discussed in the embodiment of FIG. 3C. Thus, having different timestamps is configured to inform the client 106b of the different state of the method Ma of the dependent EJB bean 114a, thus eliminating the write-write conflict shortcomings associated with the prior art. As such, as shown, in this embodiment, the code for the method Ma includes an exception "The Object Has Changed" configured to be dispatched to the client 106b. In one example, at this point, the clients may be given an option to obtain a copy of the state of the dependent EJB bean so as to determine their next course of action.

One exemplary code fragment describing the manner the EJBTC compiler implements the timestamp algorithm is shown in Table 1.

Table 1—Exemplary Timestamp Algorithm Implemented by the EJBTC

TABLE 1

Exemplary timestamp algorithm implemented by the EJBTC

```
//Automatically generated by the EJBTC compiler
//Mon Jan 07 18:50:10 PST 2002
package ejbtc;
import util.*;
public class DatabaseProxyBean extends util.JavaBeanDataObject
implements
java.io.Serializable{
    private java.lang.String__Permission;
    private java.lang.String__TableName;
    public DatabaseProxyBean( ) {
    }
    public java.lang.String getPermission( ) {
        return__Permission;
    }
    public void setPermission(java.lang.String
ejbtc__java__lang__String) {
        __Permission=ejbtc__java__lang__String;
    }
    public java.lang.String getTableName( ) {
        return__TableName;
    }
    public void setTableName(java.lang.String
ejbtc__java__lang__String) {
        __TableName=ejbtc__java__lang__String;
    }
    public void setEntityContext(javax.ejb.EntityContext
ejbtc__javax__ejb__EntityContext) {
        __EntityContext=ejbtc__javax__ejb__EntityContext;
```

TABLE 1-continued

Exemplary timestamp algorithm implemented by the EJBTC

```
    }
    private javax.ejb.EntityContext__EntityContext;
// Optimistic Transaction Algorithm
    private String__ejbtcTimestamp;
    public String getEJBTCTimestamp( ){
        return__ejbtcTimestamp;
    }
    public void setTimeStamp(String s){
        __ejbtcTimestamp = s;
    }
}
```

Figure 4:
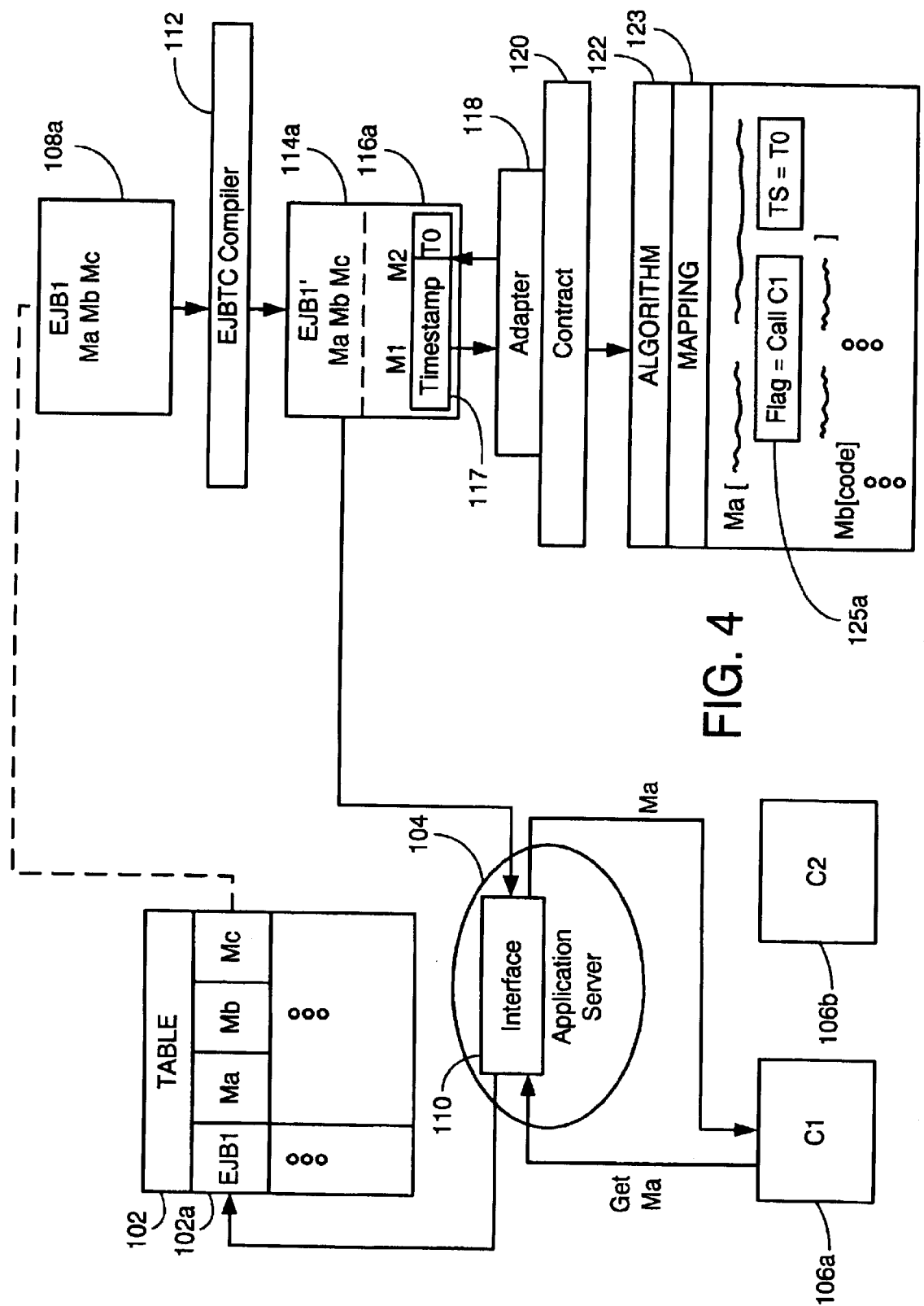
FIG. 4 is a simplified block diagram illustration showing the implementation of the EJBTC compiler of the present invention to detect write-write conflicts, a simplified illustration of a block diagram showing the implementing of the EJBTC compiler of the present invention to detect write-write conflicts in accordance to yet another embodiment of the present invention.

FIG. 4 depicts a simplified illustration of a block diagram showing the implementing of the EJBTC compiler of the present invention to detect write-write conflicts, in accordance with one embodiment of the present invention. As shown, the embodiment of FIG. 4 is substantially identical to the embodiment depicted in FIG. 3A, with the difference that the embodiment of FIG. 4 does not implement a companion component. As a result, in this embodiment, all communications between the client 106a and the EJB bean 108a are non-local.

Figure 5A:
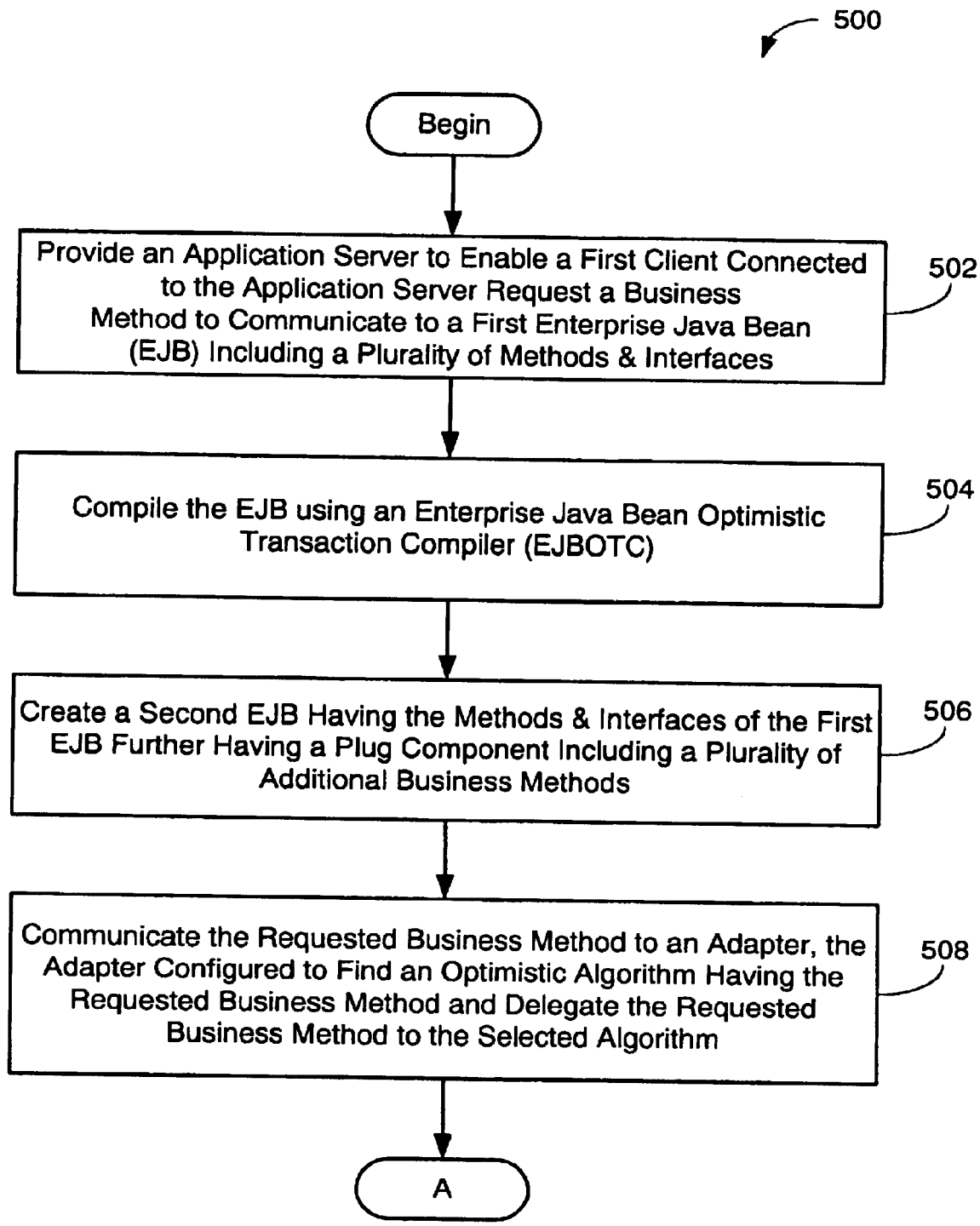
FIGS. 5A and 5B are flow chart diagrams of method operations performed by an exemplary EJBTC compiler, in accordance with yet another embodiment of the present invention.
Figure 5B:
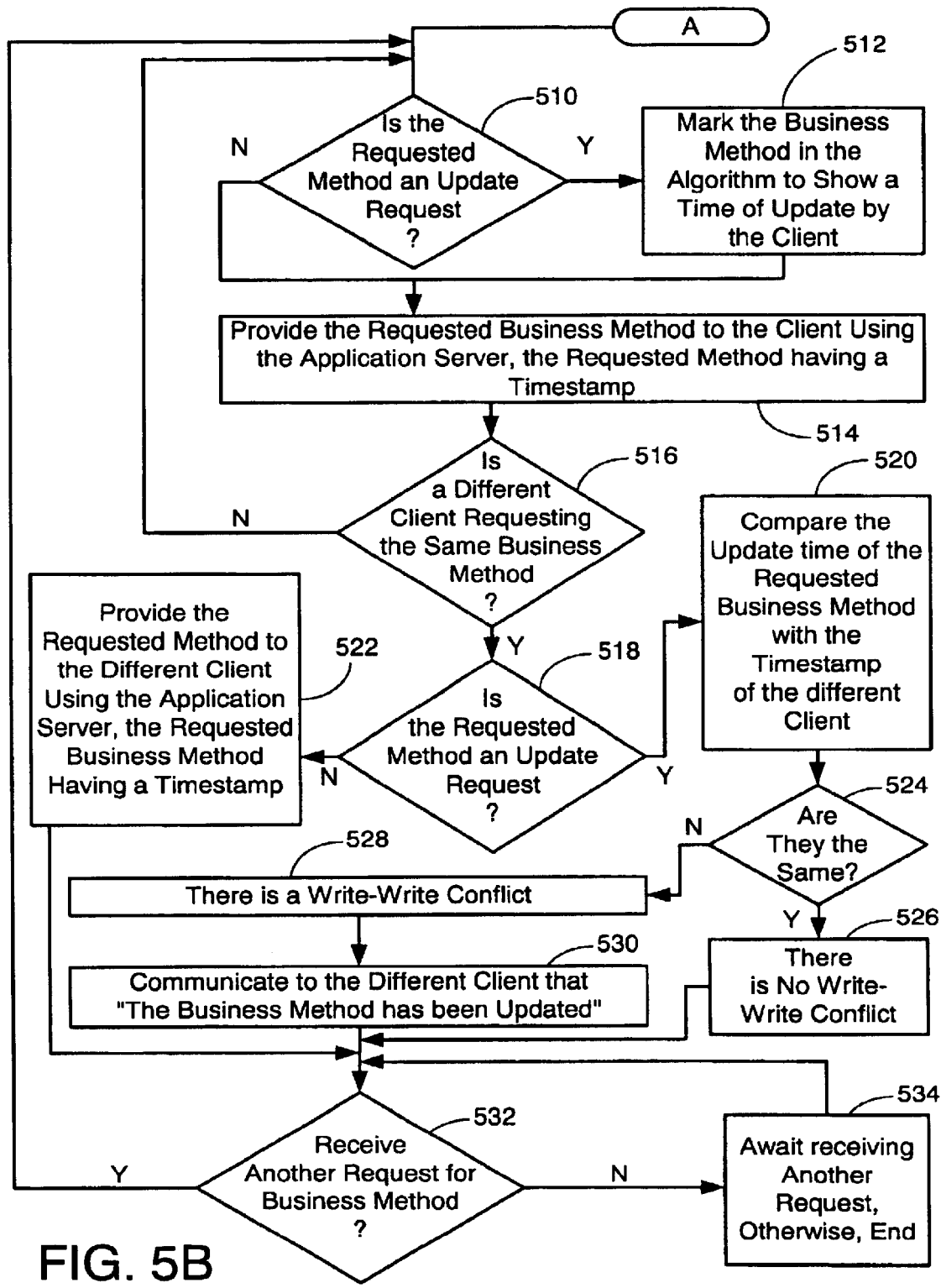

Reference is made to FIGS. 5A–5B depicting a flowchart diagram 500 illustrating the method operations performed by an exemplary EJBTC compiler, in accordance with one embodiment of the present invention. The method begins in operation 502 in which an application server is provided. The application server is configured to enable a first client that is connected to the application server to request a business method to communicate to a first EJB beam. The first EJB bean includes a plurality of methods and interfaces. Next, in operation 504, the EJB bean is compiled using the Enterprise JavaBeans optimistic transaction compiler (EJBOTC) compiler. Then, in operation 506, a second EJB bean is created. The second EJB bean has the methods and interfaces of the first EJB bean as well as a plug component (i.e., an update plug), which includes a plurality of additional business methods (e.g., update methods).

Proceeding to operation 508, the requested business method is communicated to an adapter. The adapter is configured to find an optimistic algorithm that includes the business method. The adapter is further configured to delegate the requested business method to the selected algorithm. At this point, the method 500 points to a pointer A.

Referring to FIG. 5B, when the method 500 creates the second EJB bean, the method continues from pointer A to the operation 510 in which a determination is made as to whether the requested method is an update request. If the requested method is an update request, the business method is marked in the algorithm to show the time of the update by the client. In one example, the timestamp including the time of update is defined in the plug component. In another example, the timestamp may be included in the database.

If it is determined that the requested method is not an update request, the method continues to operation 514, in which the requested business method is provided to the client using the application server. In one example, the requested method has a timestamp. Next, in operation 516 it is determined whether a different client is requesting the same business method. If the requested method is not the same business method, the method continues to operation 510, in which it is determined whether the requested method is an update request.

If in operation 516 it is determined that a different client is requesting the same business method, the method continues to operation 518 in which it is determined whether the requested method is an update request. If the requested method is an update request, the method continues to operation 520 in which the update time of the requested business method is compared with the timestamp of the different client. Then, in operation 524 it is determined whether they are the same. If they are the same, the method continues to operation 526, in which it is determined that a write-write conflict does not exists. Thereafter, the method continues to operation 532 in which a determination is made as to whether another request for a business method has been received. If another request has not been received, the method continues to operation 534 in which the method awaits receiving another request, otherwise, the method ends. If in operation 532 it is determined that another request for a business method has been received, the method continues to operation 510 in which it is determined whether the requested method is an update request.

If in operation 530 it is determined that the update time of the requested business method with the timestamp of the different client are not the same, the method continues to operation 528 in which it is determined that a write-write conflict exists. Upon making such determination, the method continues to operation 530 in which it is communicated to the different client that "the business method has been updated." Thereafter, the method continues to operation 532 in which it is determined whether another request for a business method has been received.

If in operation 518 it is determined that the requested method is not an update method, the method continues to operation 522 in which the requested business method is provided to the different client using the application server. The requested business method is configured to have a timestamp. Thereafter, the method continues to operation 532 in which it is determined whether another request for a business method has been received.

Figure 6:
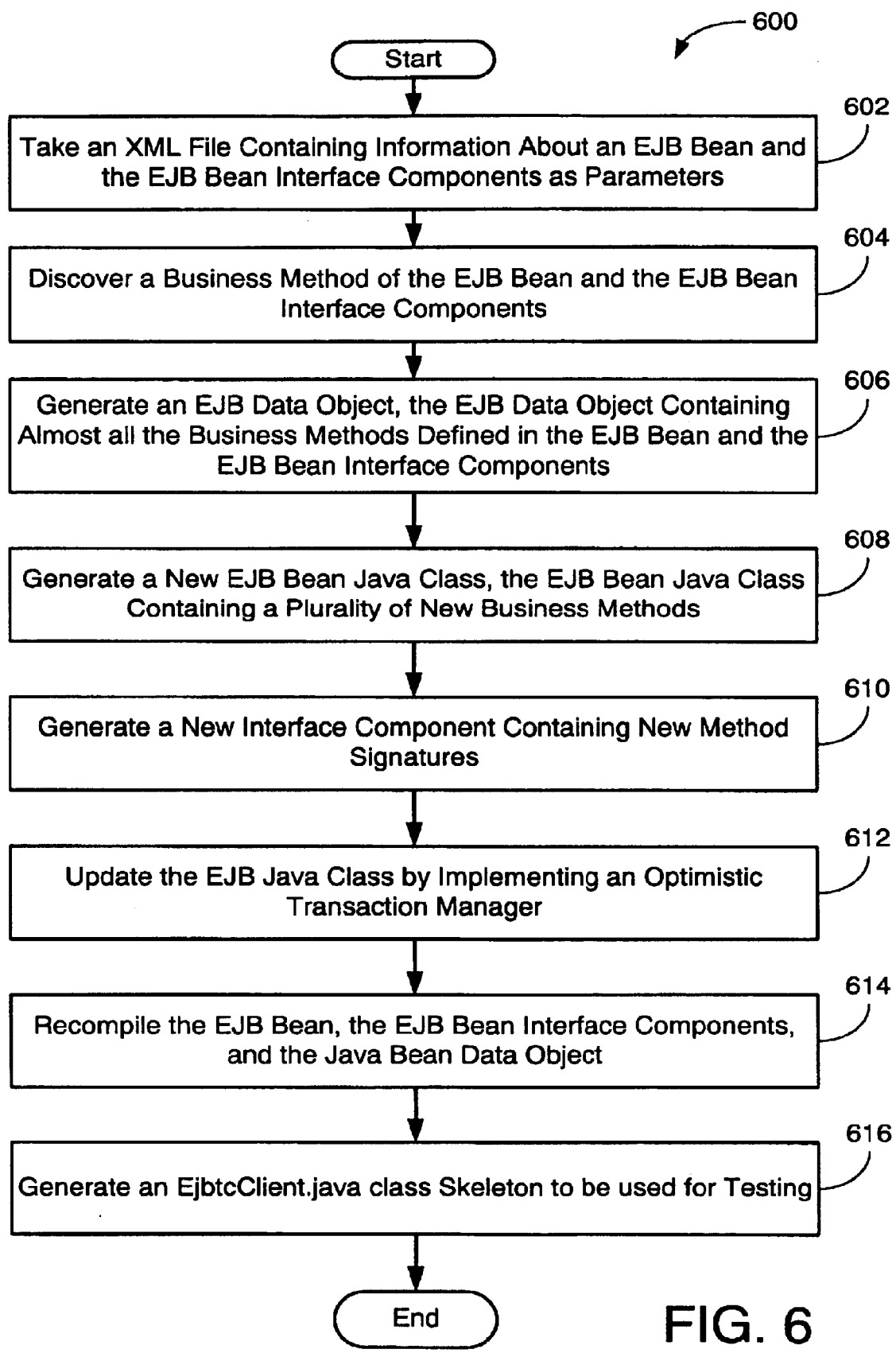
FIG. 6 depicts a flowchart diagram of the method operations performed by an EJBTC compiler, in accordance with still another embodiment of the present invention.

FIG. 6 depicts a flowchart 600 of the method operations performed by an EJBTC compiler, in accordance with one embodiment of the present invention. The method beings in operation 602 in which the EJBTC compiler accepts an XML file containing information about an EJB bean and the EJB bean interface components as parameters. Next, in operation 604, the EJBTC compiler discovers the business method of the EJB bean and the EJB bean interface components. Thereafter, in operation 606, the EJBTC compiler generates an EJB data object (i.e., the dependent EJB). The EJB object contains almost all the business methods defined in the EJB bean and the EJB bean interface components.

Proceeding to operation 608, the EJBTC compiler generates a new EJB bean Java class (e.g., companion component), which contains a plurality of new business methods. In one embodiment, the new EJB bean Java class includes four additional methods. In one instance, the four additional methods are shown in Table 2.

Table 2—Exemplary Newly Added Business Methods

TABLE 2

Exemplary Newly Added Business Methods

```
private util.EJBRuntimeApplier_ejbRuntimeApplier = new
util.EJBRuntimeApplier( );
private String_updatedTime = "";
private util.JavaBeanDataObject_javaBeanDataObject = new
ejbtc.DatabaseProxyBean( );
```

TABLE 2-continued

Exemplary Newly Added Business Methods

```
public void ejbUpdate( util.JavaBeanDataObject o) throws
java.rmi.RemoteException{
if (_updatedTime.compareTo(o.getOptimisticComparator( ).toString( ))
!= 0 &&
_updatedTime != ""){
throw new java.rmi.RemoteException(" The object have changed");
} else {
_updatedTime = java.util.Calendar.getInstance( ).getTime( ).toString( );
try{
_ejbRuntimeApplier.update(this, o);
} catch (util.EJBRuntimeApplierException ex){
ex.printStackTrace( );
}
}
}
public util.JavaBeanDataObject getJavaBeanDataObject( ){
_updatedTime = java.util.Calendar.getInstance( ).getTime( ).toString( );
_javaBeanDataObject.setOptimisticComparator(_updatedTime);
return_javaBeanDataObject;
}
public void ejbUpdate( org.w3c.dom.Document) throws
java.rmi.RemoteException{
_ejbRuntimeApplier.update( this, org.w3c.dom.Document );
}
public Document getEJBXMLSchemaObject( ) throws
java.rmi.RemoteException{
return_ejbXMLSchema;
}
```

In one instance, the business methods delegate the business login to a class EJBRuntimeApplier. By way of example, substantially all EJB beans compiled by the EJBTC compiler delegate their ejbUpdate(. . . ) business logic to the EJBRuntimeApplier. By using this object, an EJB class can update its persistent data automatically. In one example, the class follows the Java Bean getter/setter convention to make the update possible. An exemplary EJBRuntimeApplier class is shown in Table 3.

Table 3—Exemplary EJBRuntimeApplier Class

TABLE 3

Exemplary EJBRuntimeApplier Class

```
import java.lang.reflect.*;
public class EJBRuntimeApplier {
    public final static String DEFAULT_SETTER = "set";
    public final static String DEFAULT_GETTER = "get";
    public EJBRuntimeApplier( ) {
    }
    public void update( Object ejbBean, Object bean) throws
EJBRuntimeApplierException {
        update(ejbBean, bean, DEFAULT_SETTER,
            DEFAULT_GETTER);
    }
    public void update( Object ejbBean, Object bean, String setter,
String getter) throws EJBRuntimeApplierException{
        Method beanMethods[] = bean.getClass( ).getMethods( );
        Method ejbMethod;
        Method beanMethod;
        String ejbMethodName;
        String beanMethodName;
        Object beanArgument;
        try{
            for (int i=0; i < beanMethods.length; i++){
                beanMethod = beanMethods[i];
                beanMethodName = beanMethod.getName( );
```

TABLE 3-continued

Exemplary EJBRuntimeApplier Class

```
            if (beanMethodName.startsWith(getter) ){
                ejbMethodName = setter
                        + beanMethodName.substring(
beanMethodName.indexOf(getter)
                        + getter.length( ));
                ejbMethod =
                    ejbBean.getClass( ).getMethod(ejbMethodName,
new Class[]{ beanMethod.getReturnType( ) });
                    beanArgument = beanMethod.invoke(bean, null);
                    ejbMethod.invoke(ejbBean, new Object[]
                    { beanArgument });
            }
        }
    } catch( java.lang.IllegalAccessException ex){
        throw new EJBRuntimeApplierException(ex);
    } catch ( java.lang.NoSuchMethodException ex){
        throw new EJBRuntimeApplierException(ex);
    } catch (java.lang.reflect.InvocationTargetException ex){
        throw new EJBRuntimeApplierException(ex);
    }
  }
}
```

Next, in operation 610, a new interface component is generated containing a new method signatures. Table 4 includes a plurality of exemplary method signature.

Table 4—Exemplary Methods Signature

TABLE 4

Exemplary Methods Signature

```
public void ejbUpdate( JavaBeanDataObject) throws
java.rmi.RemoteException;
public void ejbUpdate( org.w3c.dom.Document) throws
java.rmi.RemoteException;
public JavaBeanDataObject getEJBDataObject( ) throws
java.rmi.RemoteException;
public Document getEJBXMLSchemaObject( ) throws
java.rmi.RemoteException;
```

Moving to operation 612, the EJB Java class is updated by implementing an optimistic transaction manager. Next, in operation 614, the EJB bean, the EJB bean interface components, and the EJB data object are recompiled. Then, in operation 616, an EjbtcClient.java class skeleton is generated, which can be used as a skeleton for testing.

By way of example, a plurality of EJBTC compiler command line options is shown in Table 5.

Table 5—Exemplary EJBTC Command Line

TABLE 5

Exemplary EJBTC Command Line java ejbtc [options] <XML file> <output folder>

In one instance, the options are shown in Table 6.

Table 6—Exemplary EJBTC Command Options

TABLE 6

Exemplary EJBTC Command Options

| | |
|---|---|
| keep | In one example, means keep intermediary Java files |
| noXMLSchema | In one aspect, means not to generate XML Schema file |
| noJavaBean | In one embodiment, means not to generate JavaBean Data Object |
| noTransaction | In one instance, means generate the EJB without a transaction algorithm |
| verbose | In one aspect, means enable verbose output |
| help | In one implementation, means display the options. |

In another embodiment, Table 7 shows exemplary XML DTD for the input file.

Table 7—Exemplary XML DTD the Input File

TABLE 7

Exemplary XML DTD the Input File

```
<?xml encoding="UTF-8" ?>
<!ELEMENT ejbtcInput (EntityBean)+>
<!ELEMENT EntityBean (EntityBean-Class?, RemoteInterface-Class?,
LocalInterface-Class?)>
<!ATTLIST EntityBean type (java | class) "java">
<!ELEMENT EntityBean-Class (#PCDATA)>
<!ELEMENT RemoteInterface-Class (#PCDATA>
```

In accordance with one embodiment, the EJBTC compiler generates a new class implementing the code shown in Table b 8.

Table 8—Exemplary EJBTC Compiler Code

TABLE 8

Exemplary EJBTC Compiler Code

```
root[csh] @ ganna[250] java -classpath
/opt/java/lib/tools.jar:/opt/ejb/lib/j2ee.jar:/
workspace:util: EJBTCCompiler
/home/ja120114/compiler/ConfExample.xml /
home/ja120114/compiler/tmp
[Deserialize XML file]
[Generating Java Bean file:
/export/home/workspace/test/security/runAs/proxy/
DatabaseProxyBean.java ]
[method name: hashCode]
[method name: wait]
[method name: wait]
[method name: wait]
[method name: getClass]
[Excluded method: getClass ]
[method name: equals]
[method name: toString]
[method name: notify]
[method name: notifyAll]
[method name: getPermission]
[method name: setPermission]
[method name: getTableName]
[method name: setTableName]
[method name: ejbCreate]
[method name: ejbCreate]
[method name: ejbCreate]
[method name: ejbPostCreate]
[method name: ejbPostCreate]
[method name: ejbPostCreate]
[method name: processCachedResults]
[method name: processStatement]
[method name: setEntityContext]
[method name: unsetEntityContext]
```

TABLE 8-continued

Exemplary EJBTC Compiler Code

[method name: ejbRemove]
[method name: ejbActivate]
[method name: ejbPassivate]
[method name: ejbLoad]
[method name: ejbStore]
[method name: ejbFindByPrimaryKey]
[method name: toXML]
[method name: toXML]
[Saving file: /home/ja120114/compiler/tmp/ejbtc/DatabaseProxyBean ]
[Compile Java Bean file: /ejbtc/DatabaseProxyBean ]
[Read EJB file:
/export/home/workspace/test/security/runAs/proxy/
DatabaseProxyBean.java ]
[Generate EJB file:
/export/home/workspace/test/security/runAs/proxy/
DatabaseProxyBean.java ]
[Saving EJB file: /home/ja120114/compiler/tmp/DatabaseProxyBean.java]
[Compile EJB file:
/export/home/workspace/test/security/runAs/proxy/
DatabaseProxyBean.java ]
[Read local interface file:
/export/home/workspace/test/security/runAs/proxy/DatabaseProxy.java ]
[Generate local interface file:
/export/home/workspace/test/security/runAs/proxy/DatabaseProxy.java ]
[Saving file : /home/ja120114/compiler/tmp/DatabaseProxy.java ]
[Compile remote interface file:
/export/home/workspace/test/security/runAs/proxy/DatabaseProxy.java ]
[Read remote interface file:
/export/home/workspace/test/security/runAs/proxy/DatabaseProxy.java ]
[Generate remote interface file:
/export/home/workspace/test/security/runAs/proxy/DatabaseProxy.java ]
[Saving file : /home/ja120114/compiler/tmp/DatabaseProxy.java ]
[Compile remote interface file:
/export/home/workspace/test/security/runAs/proxy/DatabaseProxy.java ]

Figure 7:
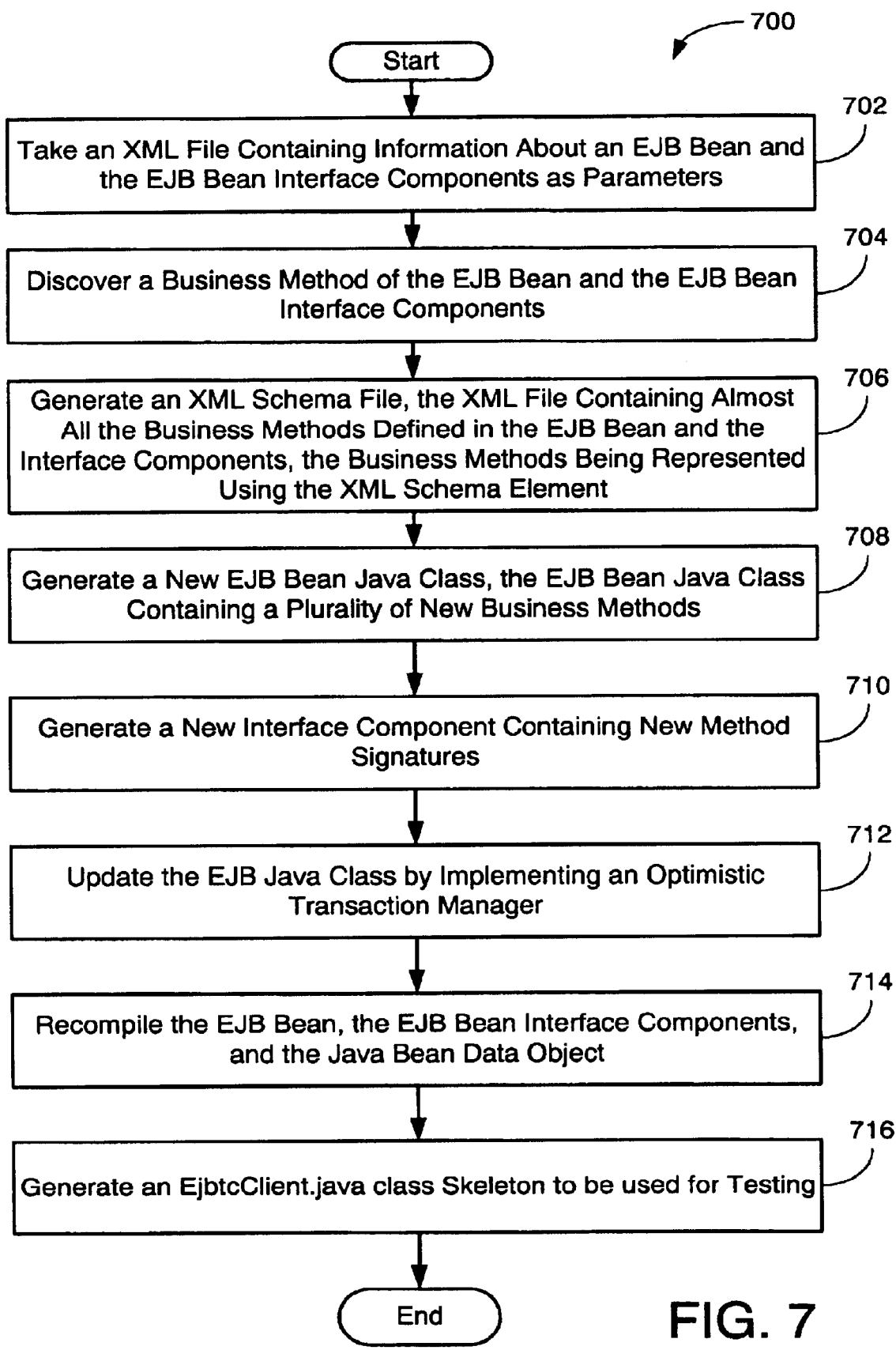
FIG. 7 depicts a flowchart diagram illustrating the method operations performed by an EJBTC compiler implementing an XML schema file companion component, in accordance with yet another embodiment of the present invention.

Flowchart 700 depicted in FIG. 7 illustrates the method operations performed by an EJBTC compiler implementing an XML schema file companion component, in accordance with another embodiment of the present invention. The method beings in operation 702 in which the EJBTC compiler takes an XML file containing information about and EJB bean and the EJB bean interface components as parameters. Next, in operation 704, the EJBTC compiler discovers the business method of the EJB bean and the EJB bean interface components. Thereafter, in operation 706, the EJBTC compiler generates an XML schema file containing almost all the business methods defined in the EJB bean and the interface components. The business methods are represented using the XML schema element.

Proceeding to operation 708, the EJBTC compiler generates a new EJB bean Java class (e.g., companion component), which contains a plurality of new business methods. In one embodiment, the new EJB bean Java class includes four additional methods. Next, in operation 710, a new interface component is generated containing a new method signatures.

Moving to operation 712, the EJB Java class is updated by implementing an optimistic transaction manager. Next, in operation 714, the EJB bean, the EJB bean interface components, and the EJB data object are recompiled. Then, in operation 716, an EjbtcClient.java class skeleton is generated, which can be used as a skeleton for testing.

The advantages of the present invention are numerous. Most notably, in the embodiments of the present invention, substantially all EJB beans can be simultaneously updated simultaneously using the EJBTC compiler substantially eliminating the computer system downtime associated with updating of the EJB beans. Another advantage of the present invention is that conflicts in state of the EJB beans as read by the clients can be detected prior to performing of any modifications by any of the clients, substantially maintaining a quality of data. Yet another advantage of the present invention is that the clients can programmatically select and implement a workaround option when conflicts occur.

With the above embodiments in mind, it should be understood that although the present invention mainly describes exemplary embodiments implementing XML schema file, in another embodiment any file suitable file format may be implemented.

Additionally, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter, be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Furthermore, although the present invention implements Enterprise JavaBeans and Java programming languages, other programming languages may be used to implement the embodiments of the present invention (e.g., C, $C_{++}$, any object oriented programming language, etc.).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for updating Enterprise JavaBeans (EJB) classes, each EJB class being managed by an application server, the application server maintaining a database of active EJB classes, the method comprising:
    defining an update plug for an existing EJB class;
    assigning the update plug to the existing EJB; and
    compiling the existing EJB class using the update plug to generate a dependent EJB class, the dependent EJB class using an adapter and a contract to gain access to methods of the dependent EJB class, each method being associated with an algorithm defining a locking timestamp.

2. A method for updating Enterprise JavaBeans (EJB) classes as recited in claim 1, wherein the update plug includes an update method.

3. A method for updating Enterprise JavaBeans (EJB) classes as recited in claim 2, wherein the methods of the dependent EJB class include a method of the EJB class and the update method of the update plug.

4. A method for updating Enterprise JavaBeans (EJB) classes as recited in claim 1, wherein the dependent EJB class is configured to create an EJB companion class, the EJB companion class configured to enable the application server access the dependent EJB class locally.

5. A method for updating Enterprise JavaBeans (EJB) classes as recited in claim 4, wherein the EJB companion class includes a companion method, the companion method configured to include the methods of the dependent EJB class.

6. A method for updating Enterprise JavaBeans (EJB) classes as recited in claim 1, wherein the update plug includes an update timestamp configured to notify whether the dependent EJB class has been updated since a last access to the dependent EJB class.

7. A method for managing shared use of Enterprise JavaBeans (EJB) classes as recited in claim 1, wherein the application server uses an interface to manage each EJB class.

8. A method for managing shared use of Enterprise JavaBeans (EJB) classes, each EJB class being managed by an application server, the application server maintaining a database of active EJB classes, the method comprising:

assigning an update plug to an existing EJB; and compiling the existing EJB class using the update plug to generate a dependent EJB class, the dependent EJB class using an adapter and a contract to gain access to methods of the dependent EJB class, each method being associated with an algorithm defining a locking timestamp, the locking timestamp being used to notify whether the dependent EJB has been updated since a last access to the dependent EJB class.

9. A method for managing shared use of Enterprise JavaBeans (EJB) classes as recited in claim 7, wherein the update plug includes an update method.

10. A method for managing shared use of Enterprise JavaBeans (EJB) classes as recited in claim 9, wherein the methods of the dependent EJB class include a method of the EJB class and the update method of the update plug.

11. A method for managing shared use of Enterprise JavaBeans (EJB) classes as recited in claim 8, wherein the update plug includes an update timestamp.

12. A method for managing shared use of Enterprise JavaBeans (EJB) classes as recited in claim 11, wherein the update timestamp is compared with the locking timestamp of each method to determine whether the dependent EJB has been updated since the last access to the dependent EJB class.

13. A method for managing shared use of Enterprise JavaBeans (EJB) classes as recited in claim 12, wherein an exception error is issued if the dependent EJB has been updated since the last access to the dependent EJB class.

14. A method for managing shared use of Enterprise JavaBeans (EJB) classes as recited in claim 8, wherein the dependent EJB class is configured to create an EJB companion class, the EJB companion class configured to enable the application server access the dependent EJB class locally.

15. A method for managing shared use of Enterprise JavaBeans (EJB) classes as recited in claim 14, wherein the EJB class companion includes a companion method, the companion method configured to include the methods of the dependent EJB class.

16. A computer program embodied on a computer readable medium for updating Enterprise JavaBeans (EJB) classes managed by an application server, the computer program comprising:

a code segment that defines an update plug for an existing EJB class;

a code segment that assigns the update plug to the existing EJB class; and a code segment that compiles the existing EJB class using the code segment that defines the update plug to generate a dependent class, the dependent class using an adapter code segment and a contract code segment to gain access to methods of the dependent EJB class, each method being associated with an algorithm code segment defining a locking timestamp.

17. A computer program as recited in claim 16, wherein the code segment that defines the update plug for an existing EJB class includes an update method.

18. A computer program as recited in claim 17, wherein the methods of the dependent EJB class include a method of the EJB class and the update method of the update plug.

19. A computer program as recited in claim 16, wherein the dependent EJB class is configured to include a code segment that creates an EJB companion class to allow the application server access the dependent EJB class locally.

20. A computer program as recited in claim 16, wherein the code segment that defines the update plug includes a code segment that defines the update timestamp.

* * * * *